C. M. McMAHEN.
FIRE PLACE.
No. 11,123. Reissued Nov. 18, 1890.
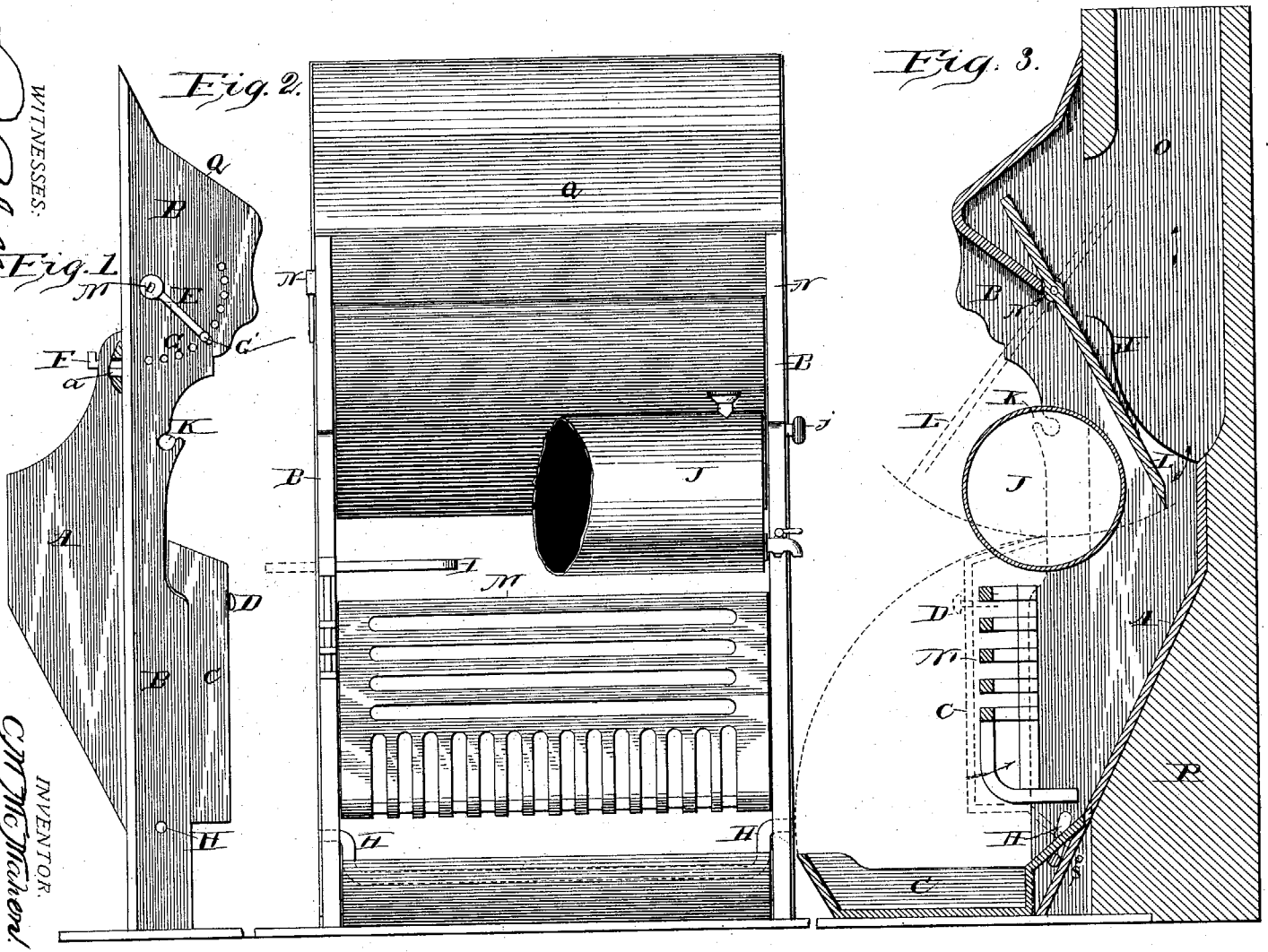
WITNESSES:
Robert G. Johnson.
Marcus S. Hopkins.
INVENTOR.
C. M. McMahen.
BY
Hopkins & Atkins.
ATTORNEYS.
THE NORRIS PETERS CO., PHOTO-LITHO., WASHINGTON, D. C.

UNITED STATES PATENT OFFICE.

COWLES MEAD McMAHEN, OF BIRMINGHAM, ALABAMA.

FIRE-PLACE.

SPECIFICATION forming part of Reissued Letters Patent No. 11,123, dated November 18, 1890.

Original No. 419,704, dated January 21, 1890. Application for reissue filed March 4, 1890. Serial No. 342,320½.

*To all whom it may concern:*

Be it known that I, COWLES MEAD McMAHEN, a citizen of the United States, residing at Birmingham, in the county of Jefferson and State of Alabama, have invented certain new and useful Improvements in Fire-Places; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1 of the drawings is a side elevation showing the detachable fire-place with the grate closed, as in summer-time; Fig. 2, a front elevation, and Fig. 3 a vertical section of fire-place and chimney.

Referring to the letters on the drawings, P represents a chimney, to which are secured jambs B B. Upon the upper portions of the jambs is secured an outwardly-projecting cross-piece or cap Q, that forms a fixed top for the fire-place opening.

L indicates a damper, which consists of a transverse plate pivoted to the jambs B and adjustable over the throat of the chimney, as shown in Fig. 3 of the drawings. The cap Q should be formed so as to close the opening into the chimney-throat above the axis of the damper and completely prevent the passage of air above the damper into the chimney. The damper is adapted to regulate the draft through the fire and to serve as a heat-deflector and a ventilator. The damper is regulated by means of handle E and pin-holes G and pin G′.

A is the fire-box, preferably made of cast-iron and provided with an ash-pan C. The latter is held in position under the grate by the crank-shaft H, as shown by Fig. 3 of the drawings. The latch D holds it to the upper bar of the grate M when it is raised, as shown in Fig. 1, so as to prevent any soot or ashes from falling or being blown down the chimney and into the room.

O is the throat of the chimney.

J represents a boiler or water-heater, which has trunnions *j*, whose bearings K are in the jambs B B, the said boiler being provided with an inlet on top and an outlet-faucet near the bottom.

I is a tea-pot holder pivoted to swing horizontally over the fire or to the outside of the grate.

N is the pivot-rod of the damper L, and F a hook which projects from the rear of jambs B and through a slot *a* on the sides of the back A to hold the back A securely to the jambs. The lower part of back A drops in behind lugs S near the bottom of the jambs, one of which is shown in Fig. 3 of the drawings, thus securing the bottom of the back to the jambs.

The damper L constitutes the most important feature of my improvements. It is suspended from the pivot-rod N, which passes through holes in the jambs B, and is adjustable on its pivot so as to rest either in a position, as shown in the full lines in Fig. 3, to operate as a heat-deflector, and thus aid in warming a room, or in the position projecting well outward, as shown in dotted lines, so as to serve as a ventilator and admit air from a room freely over the fire and up the chimney, or at an intermediate point between these positions, so as to substantially close up the opening over the fire and serve as a blower, causing the air to pass through the fire in the grate before it goes up the chimney. It therefore serves, when constructed and applied according to my plan, alternately as a deflector, ventilator, and blower. It is essential that its upper part be connected with the top of the opening of the fire-place, so as not to leave an open space above its pivotal point for the admission of air. When a large pendent damper having pivotal adjustment of such a range as I provide is applied in this manner and provided with means—for example, such as handle E and pin-holes G and pin G′—for adjusting it and setting it to any place desired, one occupying a room can conveniently have substantially perfect control of its heating and ventilation. In starting a fire, if need be, the ash-pan C can be elevated and put in place, as shown in the dotted lines, Fig. 3, and the damper set in a nearly-vertical position to connect with the upper edge of the ash-pan when a draft exclusively through the bottom of the grate upward for initiatory firing will be produced. After a fire is reasonably well started and the grate reasonably well filled, then by placing the damper in approximately a vertical position, without elevating the ash-pan, a strong draft for blowing up the fire will at once be set in operation.

What I claim is—

1. The combination, with the fire-grate and jambs of a fire-place having the cap Q, of a pendent damper pivoted to the jambs and connected with the top of a fire-place opening forward of the chimney-throat, the cap Q and the damper L being arranged so as to prevent a draft from entering over the damper, and adjusting mechanism, as the handle E, holes G, and pins G′, whereby the damper may be set in any desired position within its range of movement, so that it can act alternately as a heat-deflector, a ventilator, or a blower, substantially as set forth.

2. The fire-place jambs B B, having the bearings K K, in combination with a trunnioned boiler, as shown and described.

3. The back A and jambs B, secured together by means of the jamb-lugs F S and back slot *a*, as shown and described.

COWLES MEAD McMAHEN.

Witnesses:

MARCUS S. HOPKINS,

C. P. ELWELL.